J. ANDEL.
VERMIN TRAP.
APPLICATION FILED MAY 16, 1912.
1,048,479.
Patented Dec. 31, 1912.
2 SHEETS—SHEET 1.
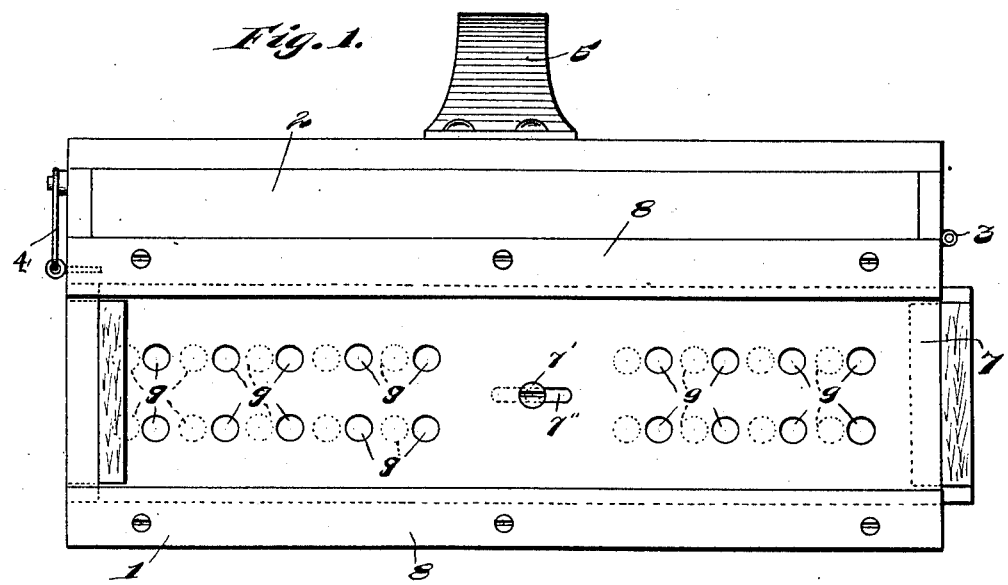
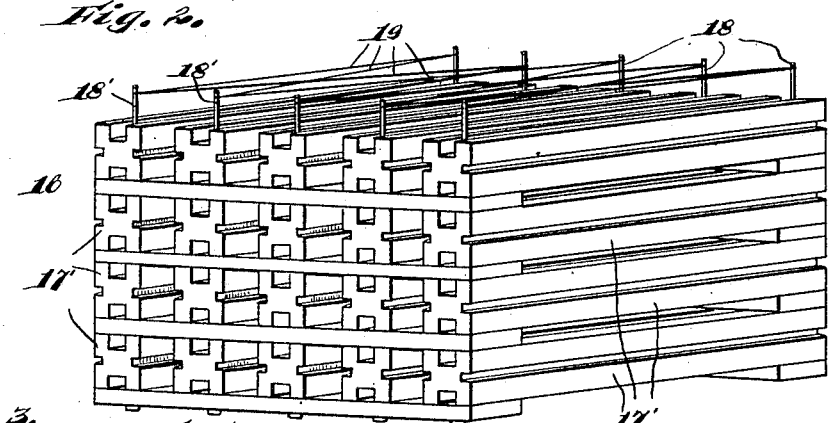
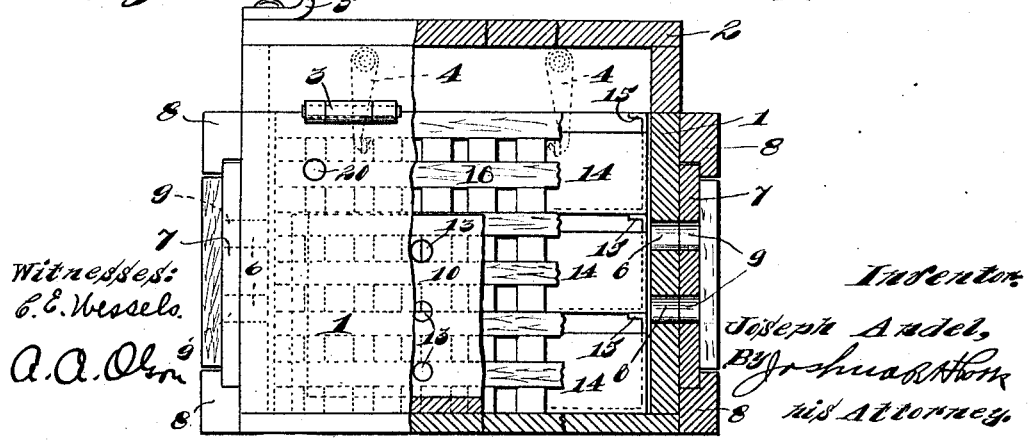

J. ANDEL.
VERMIN TRAP.
APPLICATION FILED MAY 16, 1912.
1,048,479.
Patented Dec. 31, 1912.
2 SHEETS—SHEET 2.
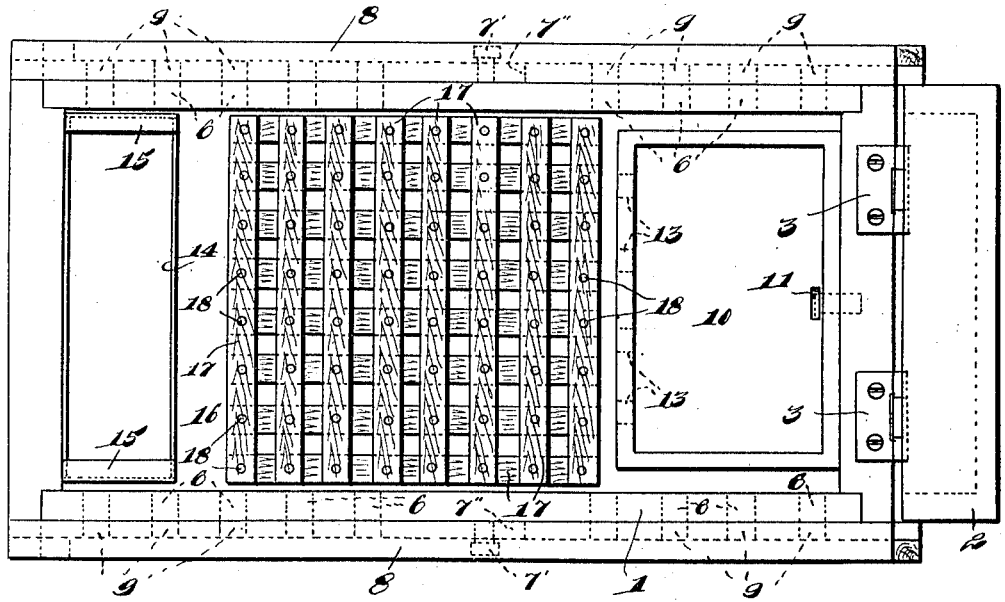
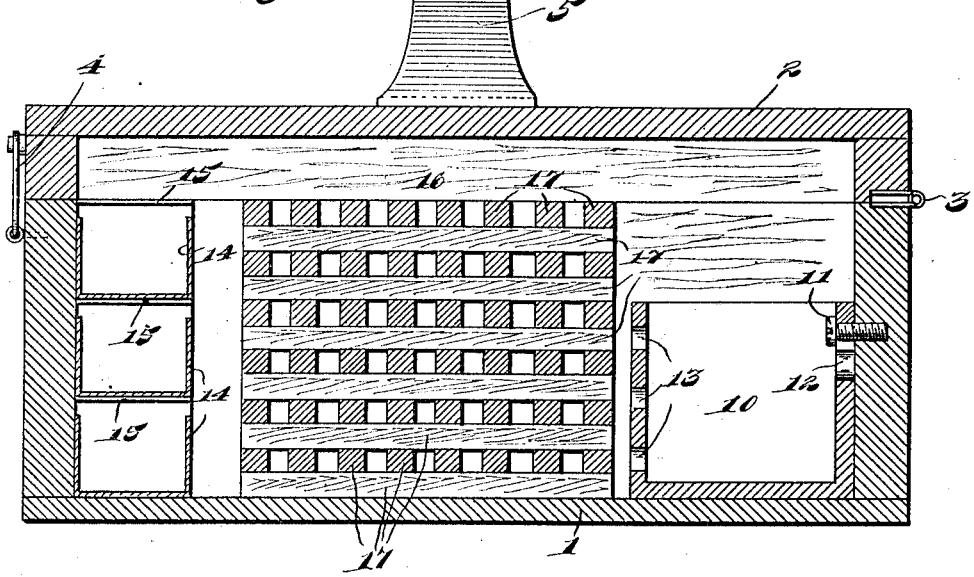
Witnesses:
E. E. Wessels
A. A. Olson
Inventor:
Joseph Andel,
By Joshua R. H. Potts
his Attorney.

UNITED STATES PATENT OFFICE.

JOSEPH ANDEL, OF CHICAGO, ILLINOIS, ASSIGNOR OF ONE-NINTH TO CHARLES KAMRADT, ONE-NINTH TO FRANK BAUER, ONE-NINTH TO WILLIAM C. WESTPFAHL, ONE-NINTH TO THOMAS HORAN, ONE-NINTH TO DENNIS A. HORAN, ONE-NINTH TO HARRY BROWN, ONE-NINTH TO HAROLD H. STEERE, AND ONE-NINTH TO JOSEPH ROUBIK, ALL OF CHICAGO, ILLINOIS.

VERMIN-TRAP.

1,048,479.     Specification of Letters Patent.     Patented Dec. 31, 1912.

Application filed May 16, 1912. Serial No. 697,614.

*To all whom it may concern:*

Be it known that I, JOSEPH ANDEL, a citizen of the United States, and a resident of the city of Chicago, county of Cook, and State of Illinois, have invented certain new and useful Improvements in Vermin-Traps, of which the following is a specification.

My invention relates to improvements in vermin traps, and more specifically to a trap of this character designed especially for use in the extermination of cockroaches.

The object of my invention is the production of a trap of the character mentioned which will be of improved construction and efficient in operation.

Other objects will appear hereinafter.

With these objects in view, my invention consists in the combinations and arrangements of parts hereinafter described and claimed.

My invention will be more readily understood by reference to the accompanying drawings forming a part of this specification, and in which—

Figure 1 is a side elevation of a vermin trap embodying my invention, Fig. 2 is a perspective view of one form of honeycombed structure for the reception of vermin which is used in the trap, Fig. 3 is a sectional end elevation of the trap, Fig. 4 is a top plan view thereof, the hinged cover of the body of the trap being swung to vertical position, and Fig. 5 is a central vertical longitudinal section of the device.

The preferred form of construction, as illustrated in the drawings, comprises a hollow body 1 which is rectangular in form. The upper side of the body 1 is open and the same is provided with a lid or cover 2 which is hingedly secured thereto at 3. Suitable fastening devices 4 are provided at the free edge of the cover 2 for locking the same in closed position. Said cover is provided with a suitable handle 5 for readily transporting the trap from place to place.

The lateral walls of the body 1 are formed with openings 6 which permit of the entrance of the vermin thereinto. Said openings 6 are controlled by slides 7 which are slidably mounted between guide strips 8 which are secured to the lateral walls of the body 1, as clearly shown in the several views. The slides 7 are formed with openings 9 adapted, when said slides are properly positioned, to register with the openings 6 so as to permit of the entrance of the vermin into the device. The slides 7 are shown in this position in Figs. 1, 3 and 4. When it is desired to close the ingress to the body 1, the slides 7 are moved to effect the non-registration of the openings 9 and 6, as will be readily understood. The movement of said slides is limited by screws 7' which register with elongated slots 7'', as shown in Fig. 1.

Arranged within the body 1 at one end thereof, is a receptacle 10 for the reception of bait of a solid nature. The receptacle 10 is releasably secured in position in the body 1 by means of a screw 11 which projects from one of the end walls of said body into engagement with a key-hole slot 12 provided in the adjacent wall of said receptacle. The arrangement is such that release of said receptacle for removing the same, may be effected by lifting said receptacle until the head of screw 10 registers with the enlarged lower end of the slot 12, as will be readily understood. The opposite wall of the receptacle 10 is provided with openings 13 which permit of ready ingress and egress of the vermin to and from the interior of said receptacle for feeding.

Provided in the body 1 at the opposite end thereof, is a plurality of superposed receptacles or pans 14 adapted, when the device is in use, to contain water or other desired liquid bait for attracting the vermin into the trap. The end walls of the receptacles 14 are extended upwardly to constitute supports 15 for spacing said receptacles from each other so that the vermin may readily find their way into said receptacles.

Arranged in the body 1 between the receptacle 10 and the receptacles 14, is a structure or resting place 16 for the vermin after the latter have partaken of the food provided for them in said receptacles. The structure 16 is formed of a plurality of superposed layers of spaced bars 17 which are secured together in spaced relation by rods or other fastening devices 18. A honey-combed structure is thus formed which is adapted to accommodate a great number of vermin. If desired, a structure 16 of the form shown in Fig. 2, may be employed, said structure being formed of a plurality of bars 17' spaced apart and connected, as shown, by the rods 18', the longitudinal faces of said bars being provided with grooves for accommodating especially the smaller or young insects. At the upper side of the structure shown in Fig. 2, is stretched a plurality of cords 19 upon which the vermin may lay their eggs if desired, this form being especially designed for summer use or in breeding season.

In using the trap, the slides 7 are first arranged so as to open the openings 6. The vermin will be attracted through said openings to the interior of the body 1 by the bait arranged in the receptacles 10 and 14. When a large number of vermin have passed into the device, the slides 7 are moved to close the openings 6, thereby entrapping the vermin within, the closing of the openings 6 shutting off the avenues of escape from the trap. One end of said body is provided with a small perforation 20 into which may be inserted a pipe or other tube for forcing smoke into the device to drive the vermin therefrom, after raising of the lid 2, into another receptacle for extermination.

The device is simple in construction and is highly efficient in use.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A vermin trap comprising a hollow body having perforated walls; manually operable means controlling the openings in said walls; and a honey-combed structure for the reception of vermin arranged in said body, substantially as described.

2. A vermin trap comprising a hollow body having perforated walls; manually operable means controlling the openings in said walls; and bait receptacles and a structure for the reception of vermin arranged in said body, said structure comprising a plurality of superposed layers of spaced bars, substantially as described.

3. A vermin trap comprising a hollow body having perforated walls; manually operable means controlling the openings in said walls; bait receptacles and a structure for the reception of vermin arranged in said body, said structure comprising a plurality of superposed layers of spaced bars; and a plurality of cords stretched adjacent said bars, substantially as described.

4. A vermin trap comprising a hollow body having perforated walls; manually operable means controlling the openings in said walls; bait receptacles and a structure for the reception of vermin arranged in said body, said structure comprising a plurality of superposed layers of spaced bars, the sides of said bars being grooved; and a plurality of cords stretched adjacent said bars, substantially as described.

5. A vermin trap comprising a hollow body having a hinged top provided with a handle, fastening means for said top, the lateral walls of said body being provided with openings; perforated slides mounted upon said lateral walls, said slides having openings registrable with the openings in said walls; bait receptacles arranged in said body at the respective ends thereof; and a honey-combed structure for the reception of vermin arranged in said body between said bait receptacles, substantially as described.

In testimony whereof I have signed my name to this specification in the presence of two subscribing witnesses.

JOSEPH ANDEL.

Witnesses:
 ARTHUR A. OLSON,
 JOSHUA R. H. POTTS.

---

Copies of this patent may be obtained for five cents each, by addressing the "Commissioner of Patents, Washington, D. C."